No. 651,144. Patented June 5, 1900.
J. W. LEDOUX.
FILTER.
(Application filed Dec. 4, 1899.)
(No Model.) 3 Sheets—Sheet 1.

WITNESSES:
INVENTOR
John W Ledoux
BY Charles N Butler
ATTORNEY

No. 651,144. Patented June 5, 1900.
J. W. LEDOUX.
FILTER.
(Application filed Dec. 4, 1899.)
(No Model.) 3 Sheets—Sheet 2.

WITNESSES:
A. V. Groupé
Percival H. Granger.

INVENTOR
John W. Ledoux
BY Charles N. Butler
ATTORNEY

No. 651,144. Patented June 5, 1900.
J. W. LEDOUX.
FILTER.
(Application filed Dec. 4, 1899.)
(No Model.) 3 Sheets—Sheet 3.

WITNESSES:
A. V. Groups
Percival H. Granger.

INVENTOR
John W. Ledoux
BY
Charles N. Butler
ATTORNEY

UNITED STATES PATENT OFFICE.

JOHN W. LEDOUX, OF SWARTHMORE, PENNSYLVANIA.

FILTER.

SPECIFICATION forming part of Letters Patent No. 651,144, dated June 5, 1900.

Application filed December 4, 1899. Serial No. 739,172. (No model.)

*To all whom it may concern:*

Be it known that I, JOHN W. LEDOUX, residing at Swarthmore, in the county of Delaware and State of Pennsylvania, have invented new and useful Improvements in Filters, of which the following is a specification.

This invention relates to the class of filters in which water or other liquid is purified by percolating through a bed of sand, gravel, or other suitable materials. It is designed to improve filtration by providing a simplified and more efficient system for draining and controlling the filtered water, but more especially to provide a simplified and more efficient system for washing the filter-bed and the filter. The construction of the drainage system is such that the tendency to stoppage is reduced to a minimum, and the effectiveness of washing may be materially increased by its coöperation. The entire drainage system may be cut off from the washing system by a single operation, or any single drain or combination of drains may be closed while the others are employed either in draining or washing. The construction of the washing apparatus is such that the several strata of the filter-bed may be transposed thereby and thoroughly washed. The transposition of material and washing are entirely within control. Sectional washing may be resorted to, if for any reason this should be deemed desirable. The simultaneous washing of all of the sections is, however, the preferred form of operation, which may be carried on either with or without the coöperation of the drains.

Figure 1:
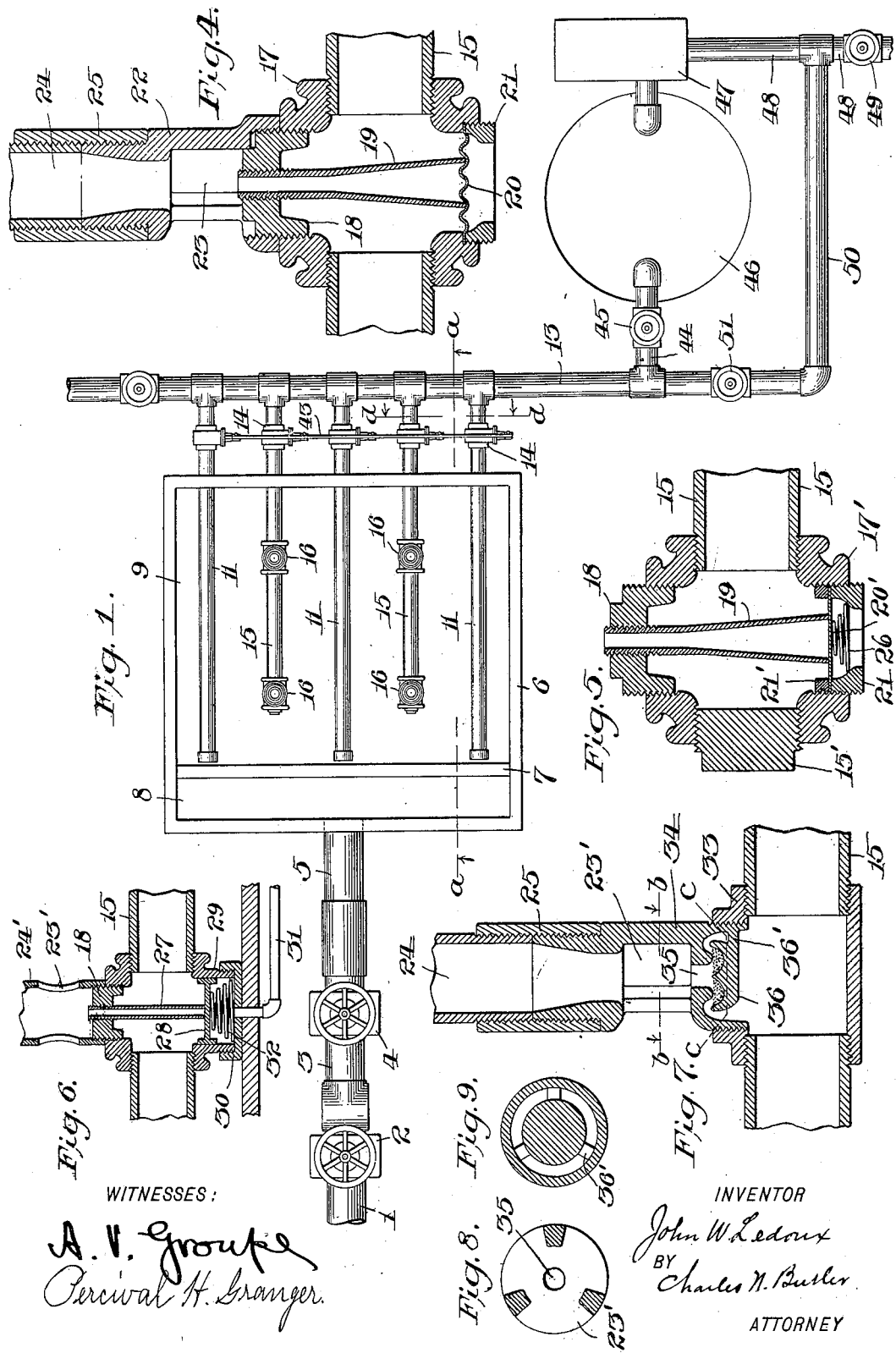
Figure 2:
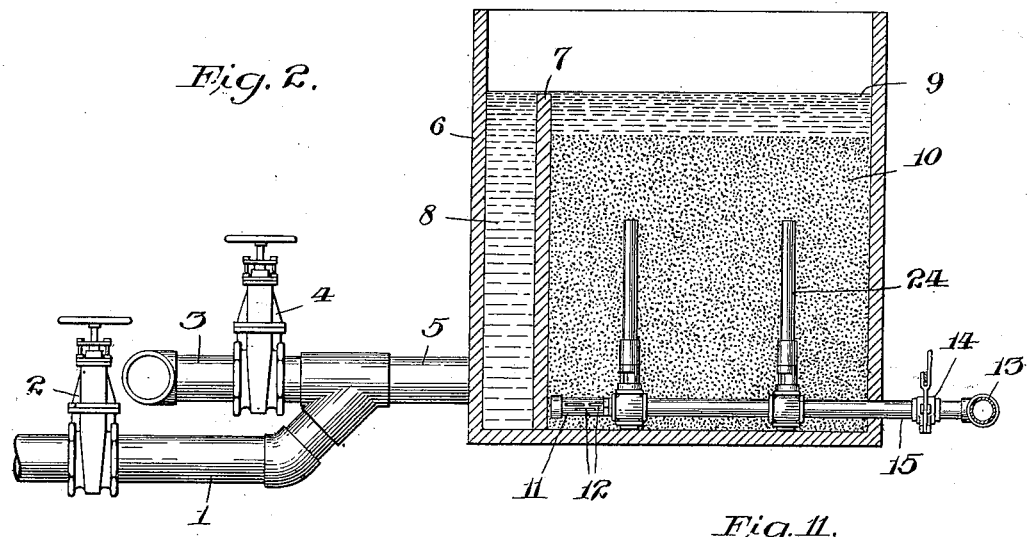
Figure 11:
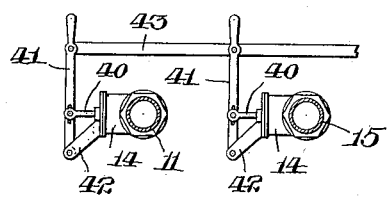
Figure 10:
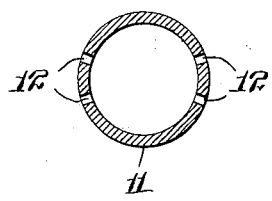
Figure 3:
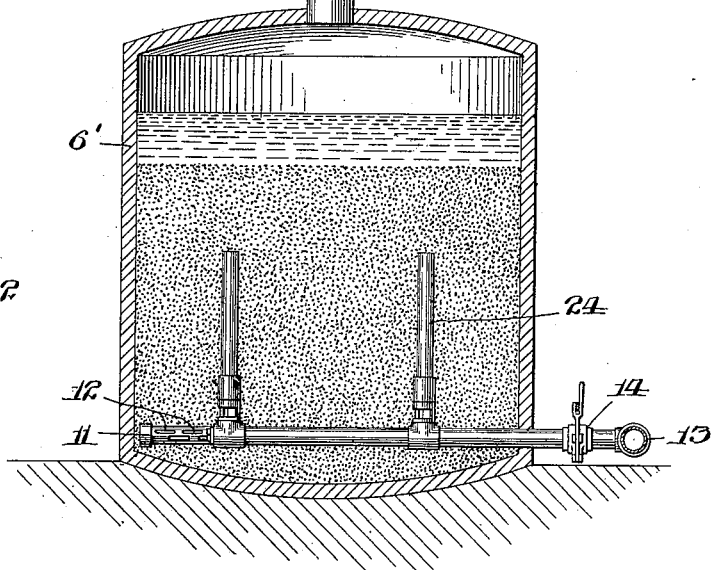
Figure 12:
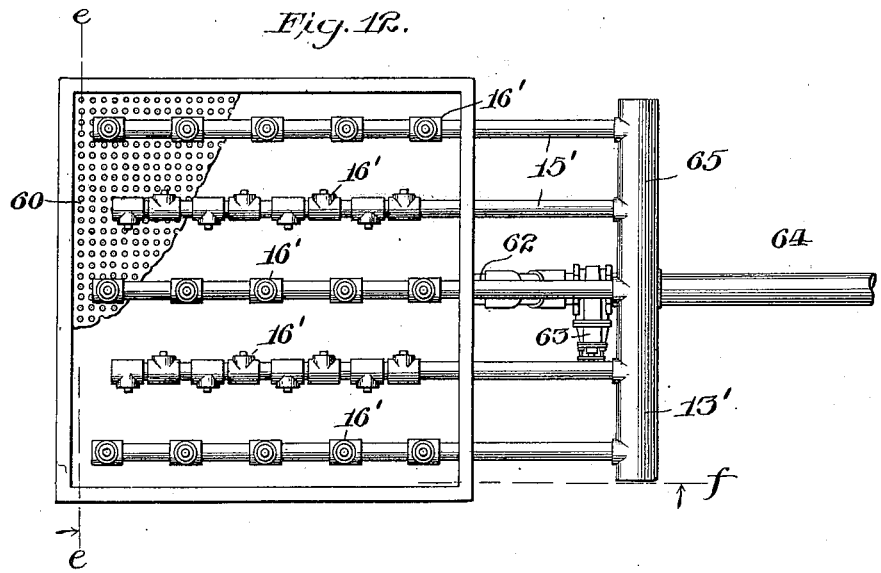
Figure 13:
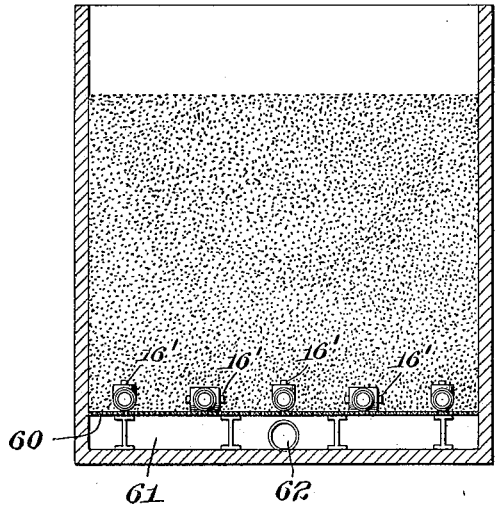
Figure 14:
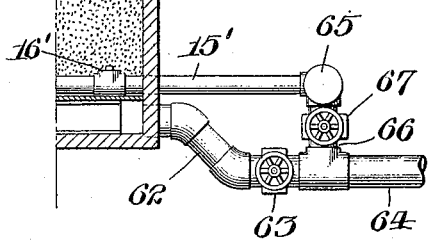

In the accompanying drawings, Figure 1 is a plan view of the mechanism I have devised for carrying out my invention. Fig. 2 is a vertical sectional view thereof, taken on the line $a\,a$ of Fig. 1. Fig. 3 is a vertical sectional view of a modification of the construction illustrated in Fig. 2. Fig. 4 is a vertical sectional view of a jetting apparatus employed in my invention. Fig. 5 is a vertical sectional view of a modification of the apparatus illustrated in Fig. 4. Fig. 6 is a vertical sectional view of a further form of jetting apparatus that may be employed. Fig. 7 is a vertical sectional view of an additional form of jetting apparatus that may be employed. Fig. 8 is a sectional view taken on the line $b\,b$ of Fig. 7. Fig. 9 is a sectional view taken on the line $c\,c$ of Fig. 7. Fig. 10 is an enlarged sectional view in illustration of the construction of the drain-pipe employed. Fig. 11 is an elevation of the valve-operating mechanism, taken on the line $d\,d$ of Fig. 1. Fig. 12 is a plan view illustrating a modification in the mode of applying my invention. Fig. 13 is a vertical sectional view taken on the line $e\,e$ of Fig. 12. Fig. 14 is a vertical partial sectional view taken on the line $f\,f$ of Fig. 12.

As illustrated in Figs. 1 and 2 of the drawings, the supply-pipe 1, controlled by the valve 2, and the drain-pipe 3, controlled by the valve 4, are connected by the pipe 5 with the filter 6. The interior of the filter is separated by the weir 7 into the inlet-chamber 8 and the filtering-chamber 9, which contains the filter-bed 10. In the bottom of the filter-bed are located the drain-pipes 11, having the lateral slot-like apertures 12, which by reason of their form and location reduce to a minimum the tendency to stoppage due to the gravitation of sediment or other material in the operation of draining and afford a section of comparatively-large area and peculiarly-advantageous character for jetting sheets of water in the operation of washing. These drain-pipes are connected to a main 13 and are provided with the valves 14. In the bottom of the filter-bed are placed further pipes 15, which are also connected with the main 13 and are provided with valves 14. The pipes 15 are provided with apparatus 16, designed to force jets of water upward through the filter-bed in the operation of washing, the construction permitting the use of a large jet under sufficient pressure to break up and transpose the layers of sand, gravel, or other filtering material and wash out all silt or other deleterious deposits.

The jetting apparatus, as illustrated in Fig. 4, comprises a coupling 17, connected with the pipe 15, a plug 18, set in the coupling, a nozzle 19, set in the plug, and a corrugated diaphragm 20, held to the coupling and to the mouth of the nozzle by the perforated clamp-nut 21. The plug 18 holds a second nozzle 22, having the lateral apertures 23. A vertical pipe 24 is connected to the nozzle 22 by the coupling 25 and may extend through the filter-bed to the height desired; but the nozzle 22 and the pipe 24 may be omitted, and the coupling may be of any construction suitable for holding a jetting device, as a branch integral with the pipe.

The jetting apparatus illustrated in Fig. 4 may be modified, as illustrated in Fig. 5, in which the coupling 17' receives a clamping-ring 21' and the perforated clamping-nut 21, which hold a plain diaphragm 20' across the mouth of the nozzle 19. The diaphragm may be sustained by a coiled spring 26. A plug 15' is employed here to illustrate the construction when the jetting apparatus is used on the end of the wash-pipe 15.

It will be understood that the purpose of covering the nozzle or tube by a diaphragm or otherwise is to prevent sand from the filter-bed from choking up the wash-pipes.

In the form of the apparatus illustrated in Fig. 6 the nozzle or tube 27, supported by the plug 18, has its lower end closed by a piston 28, adapted to reciprocate in the cylinder 29. The end of the cylinder is closed by the cap 30, from which a pipe 31 extends through the filter-casing to permit the escape of water or other matter that may get behind the piston. A coiled spring 32, supported by the cap 30, sustains the piston 28. The nozzle 22 and the tube 24 may be connected to the plug 18, as in Fig. 4, or a tube 24', having apertures 23' therein, may be substituted therefor, or both may be omitted.

In the form of the apparatus illustrated in Fig. 7 the coupling 33 receives a nozzle 34, having an aperture 35, beneath which a guard-cup 36 is placed, being sustained by the arms 36', as illustrated in Figs. 7, 8, and 9. The nozzle is provided with the lateral openings 23' and has the pipe 24 connected therewith by the coupling 25. The cup is designed to act as a dam for checking the passage of sand through the aperture 35 into the pipe 15.

The valves 14 are preferably so placed that their stems 40, operating horizontally, may be connected with vertical levers 41, pivoted to fulcrums 42. The levers 41 are connected to a rod 43 by any suitable form of readily-removable connection, so that the valves may be operated either simultaneously or separately.

The filtered water may be carried by a pipe 44, controlled by a valve 45, to a suction-well 46 and the water forced thence by a pump 47 through the distribution system 48, controlled by a valve 49. A pipe 50 leads from the pump and the distribution system back to the pipe 13, its communication therewith being controlled by the valve 51.

In the application of my invention by the mechanism explained in filtering with the valves 2 and 14 open and the valve 4 closed water passes through the pipes 1 and 5 into the inlet-chamber 8 and passing over the weir 7 percolates through the filter-bed and drains off through the pipes 11, having the apertures 12 therein, by way of the main 13. If the suction-well 46 is employed, it passes thereto through the pipe 44 and is pumped through the distribution system 48.

When through deposition of sediment or other deleterious matter it becomes necessary to wash the filter, the valves 2, 45, and 49 are closed and the valves 4, 14, and 51 are opened. The pump 47 now forces water through the filter-bed by the pipes 48, 50, 13, 11, and 15, and the wash passes off through the pipe 3, or by opening the valve 49 the pressure of the distribution system may be utilized in washing.

In the operation of washing water forced back through the pipes 11 is discharged in substantially-horizontal sheets through the apertures 12, breaking up the substratum of the filter-bed and carrying it toward the jetting apparatus 16. Simultaneous therewith vertical jets of water are forced upward through the filter-bed by the jetting apparatus through the back pressure of water in the pipes 15, and the suction carries upward the surrounding sand and water.

In case the jetting apparatus illustrated in Fig. 4 or Fig. 5 is used the pressure in the pipes 15 will force down the diaphragm 20 or 20' and uncover the mouth of the nozzle 19, when a jet will pass therethrough and carry upward with its current the substratum of the filter-bed, broken up by its own action and the coöperation of the horizontal jets from the apertures in the drain-pipes.

In case the jetting apparatus illustrated in Fig. 6 is employed the force of the back pressure of water in the pipes 15 forces down the piston 28 against the action of the spring 32 and uncovers the mouth of the nozzle 27, when a vertical jet is projected therethrough, which coacts with the horizontal jets from the drain-pipes in breaking up the substratum of the filter-bed and carrying it to the top.

In using the jetting apparatus illustrated in Fig. 7 the backward pressure of water in the pipes 15 forces a jet upward through the aperture 35, the jet coöperating, as previously explained, with the horizontal jets in breaking up and transposing the substratum.

The operation may be carried on by the substitution of equivalent devices for performing the functions of the jetting apparatus described or, less satisfactorily, by employing merely openings for projecting vertical jets.

It will appear that by manipulating the valves 14 any one or more of the pipes 11 or any one or more of the pipes 15 may be cut off while the others are used.

As illustrated in Fig. 3, the form of the filter may be changed to employ a closed cylindrical filter-chamber 6', having a spherical top and bottom. In this construction the supply in filtering and the overflow in washing pass through the pipe 5'. This construction is adapted for forcing water through the filter by the application of pressure.

As illustrated in Figs. 12, 13, and 14, water percolating through the filter-bed may be drained through a perforated bottom 60 into a drain-chamber 61, passing thence through the drain-pipe 62, controlled by the valve 63, to the main 64. The main 64 is connected with a header 65 by a pipe 66, controlled by the valve 67, the header communicating with pipes 15'. The pipes 15' are provided with the jetting devices 16'. The jetting devices 16' on the outer pipes 15' operate vertically, and the alternate pipes have their jetting devices arranged to operate, respectively, horizontally and vertically, the function of the horizontal jets being to aid in breaking up the substratum and that of the vertical jets to coact therewith and transpose the substratum to the higher levels. It will be evident that any of the devices illustrated in Figs. 4, 5, 6, and 7 may be used as the jetting devices 16'.

By the operations described I am enabled, by means of jets of water, to thoroughly agitate and wash the sand or other materials composing the filter-bed regardless of its size. The size and force of the jets which may be used are not limited, as in the apparatus heretofore, and are sufficient to thoroughly agitate the bed, which was formerly accomplished by machines of limited size and capacity, necessitating limitations in the size and capacity of the filter. This agitation and washing are accomplished by my invention not only more effectually and without limitation as to the size of the filter, but with greater economy and expedition.

Having thus described my invention, I claim—

1. In a filter, a pipe, a jetting device which communicates therewith and discharges directly into the filtering material a solid stream for agitating, transposing and washing the filtering material, and mechanism for preventing the passage of sand or similar materials through said jetting device into said pipe, substantially as specified.

2. In a filter, a series of pipes having lateral jetting devices therein for agitating, transposing and washing the filtering material, in combination with an alternating series of pipes having vertical jetting devices therein for agitating, transposing and washing the filtering material, said vertical jetting devices automatically closing and preventing the admission of sand to said pipes, substantially as specified.

3. In a filter, a series of pipes having lateral jetting devices therein for agitating, transposing and washing the filtering material, in combination with a series of pipes having vertical automatically-closing jetting devices therein for agitating, transposing and washing the filtering material, said lateral jetting devices comprising part of the drainage system of said filter.

4. In a filter, in combination with a filter-bed, a pipe having lateral slot-like apertures therein for draining and washing the filtering-bed, a pipe having vertical jetting devices in the top thereof for washing the filter-bed, said vertical jetting devices comprising a nozzle, and means for preventing the passage of sand or similar materials from said filter through said jetting devices, substantially as specified.

5. In a filter, in combination with a filter-bed, a series of pipes having lateral jetting devices therein, an alternating series of pipes having vertical jetting devices therein, a main or header with which each of said pipes is connected, a valve for controlling the communication of each of said pipes with said main, and mechanism whereby said valves may be operated simultaneously or separately, substantially as specified.

6. A jetting device comprising a nozzle, a second nozzle attached thereto, a lateral aperture between said nozzles, and automatic means for closing said first nozzle, substantially as specified.

7. A jetting device comprising a nozzle, a second nozzle attached thereto, a lateral aperture between said nozzles, and mechanism opened by pressure and automatically closing for controlling the passage through said first nozzle, substantially as specified.

8. A jetting device comprising a coupling, a nozzle fixed in said coupling, a pipe connected with said coupling, and a reciprocating diaphragm for cutting off communication between said nozzle and pipe, substantially as specified.

9. In a filter, in combination with a filter-bed, a lateral pipe in the bottom of said filter-bed, a jetting device having a nozzle attached to said pipe, a vertical pipe attached to said nozzle, one or more lateral openings between said nozzle and vertical pipe, and means for controlling the passage through said nozzle, substantially as specified.

10. In a filter, in combination with a filter-bed, a series of pipes having lateral slot-like apertures therein for draining and washing, a series of alternating pipes having vertical jetting devices therein for washing, said jetting devices comprising a compound nozzle and a vertical pipe connected therewith, and a main connected with each of said pipes, substantially as specified.

11. In a filter, in combination with a filter-bed, a series of pipes having lateral slot-like apertures therein for draining and washing, a series of alternating pipes having vertical jetting devices comprising a nozzle and a device for controlling the passage from said filter-bed through said nozzle, a main connected with each of said pipes for both draining and washing the filter, and a valve for controlling the communication between said main and each of said pipes, substantially as specified.

In witness whereof I have hereunto set my hand in the presence of the subscribing witnesses.

JOHN W. LEDOUX.

Witnesses:
 JNO. STOKES ADAMS,
 C. N. BUTLER.